(12) United States Patent
Clapp

(10) Patent No.: US 8,922,650 B2
(45) Date of Patent: Dec. 30, 2014

(54) SYSTEMS AND METHODS FOR GEOGRAPHIC VIDEO INTERFACE AND COLLABORATION

(75) Inventor: Glenn Daniel Clapp, Sandy, UT (US)

(73) Assignee: Logitech Europe S.A., Lausanne (CH)

( * ) Notice: Subject to any disclaimer, the term of this patent is extended or adjusted under 35 U.S.C. 154(b) by 1682 days.

(21) Appl. No.: 12/133,419

(22) Filed: Jun. 5, 2008

(65) Prior Publication Data

US 2009/0015672 A1 Jan. 15, 2009

Related U.S. Application Data

(60) Provisional application No. 60/949,558, filed on Jul. 13, 2007.

(51) Int. Cl.
*H04N 7/18* (2006.01)
*G06F 17/30* (2006.01)

(52) U.S. Cl.
CPC .... *G06F 17/30796* (2013.01); *G06F 17/30817* (2013.01)
USPC .......................................... 348/143; 348/159

(58) Field of Classification Search
CPC ................................................ G06F 17/30817
USPC ......................................................... 348/143
See application file for complete search history.

(56) References Cited

U.S. PATENT DOCUMENTS

| | | | |
|---|---|---|---|
| 6,542,191 B1 | 4/2003 | Yonezawa | |
| 2008/0104019 A1* | 5/2008 | Nath | 707/3 |
| 2008/0150963 A1* | 6/2008 | Stambaugh | 345/629 |
| 2011/0265136 A1* | 10/2011 | Liwerant et al. | 725/112 |

* cited by examiner

*Primary Examiner* — Bryan Lee
(74) *Attorney, Agent, or Firm* — Kilpatrick Townsend & Stockton LLP

(57) ABSTRACT

One embodiment of the present invention relates to a method for facilitating a geographic video data interface and interactive collaboration system. The method includes displaying representations of stored video data sets on an interactive geographic interface to facilitate collaboration among users. The interactive geographic interface includes a visual representation which may be manipulated including pan, zoom level, content, filtering, map type, elevation, etc. Video data sets are received from the video owner including at least video data/sequences and associated characteristic data. The received video data sets are correlated with a geographic location at which the video data was captured. The correlated geographic location is aggregated with the video data set. The video data set is displayed on the interactive geographic interface by a visual representation at the correlated location. Collaboration data about the video data set is received from users or clients other than the video owner.

17 Claims, 6 Drawing Sheets

SYSTEMS AND METHODS FOR GEOGRAPHIC VIDEO INTERFACE AND COLLABORATION

RELATED APPLICATIONS

This application claims priority to U.S. provisional application Ser. No. 60/949,558 filed Jul. 13, 2007, the contents of which are incorporated by reference.

FIELD OF THE INVENTION

The invention generally relates to video data collaboration. In particular, the invention relates to systems and methods for geographically based video interactive collaboration.

BACKGROUND OF THE INVENTION

Video monitoring systems are used to monitor video signals from one or more discrete locations or view angles. These systems are often used for security, surveillance, and personnel performance monitoring. Video monitoring systems generally include video capture devices, a control device, and a display. The video capture devices are a group of cameras configured to record video data at particular discrete locations. The control device is a computer or electronic module that receives the video data from each of the video capture devices and routes the signal to the display. The display converts the video data into a visually identifiable format. These components may be embedded into a personal computer or digital computer network, or it may incorporate portions of a computer network for purposes of data transmission and/or display.

Although video monitoring systems are often positioned to record proprietary or private data, they often routinely record non-private data. For example, a video capture device positioned to record video of a residential entrance may record video of both sensitive and non-sensitive data. The sensitive data may include images of the occupants entering or vacating the premises through the residential entrance. Most individuals would prefer to avoid making public certain images or video data of themselves for a variety of reasons. Whereas, the same video capture device may also record a criminal attempting to break into the residence, steal a package left at the entrance, and/or vandalize the entrance. This criminal video data is not sensitive or private and is often shared with law enforcement agencies for purposes of identifying or apprehending the offending individual(s). Unfortunately, the recorded video data may be insufficient to identify the responsible criminals. For example, the offending individual(s) may have intentionally avoided or disabled the video capture device. Likewise, the video capture device may have malfunctioned or not provided sufficient detail for identification. However, the video monitoring system has still recorded information that may be used in conjunction with other information to identify the individual(s).

One type of conventional data aggregation and correlation includes directly contacting other individuals who may possess information which may be incorporated with the data obtained by the video monitoring system. For example, after a residential crime is committed, law enforcement personnel and/or neighborhood watch organizations often contact individuals within a geographic region. A neighbor may have additional information about the crime which could be used in conjunction with the video data to identify the individual(s). Likewise, law enforcement may attempt to correlate data about the crime with other crimes across a larger geographic region. Unfortunately, these techniques of contacting individuals and correlating data are primarily manual processes which require a significant amount of resources to execute effectively.

Therefore, there is a need in the video data monitoring industry for systems and methods of efficient video data aggregation and correlation.

SUMMARY OF THE INVENTION

The present invention relates to systems and methods for video data collaboration. One embodiment of the present invention relates to a method for facilitating a geographic video data interface and interactive collaboration system. The method includes displaying representations of stored video data sets on an interactive geographic interface to facilitate collaboration among users. The video data sets are stored on a data storage device that is remotely accessible by a plurality of users across a global data network such as the Internet. The interactive geographic interface includes a visual representation which may be manipulated including pan, zoom level, content, filtering, map type, elevation, etc. Video data sets are received from the video owner including at least video data/ sequences and associated characteristic data. The received video data sets are correlated with a geographic location at which the video data was captured. The correlated geographic location is aggregated with the video data set. The video data set is displayed on the interactive geographic interface by a visual representation at the correlated location. Collaboration data about the video data set is received from users or clients other than the video owner. The collaboration data may include observations, comments, geographical links, tags, and/or information about the subject matter of the video data file. The collaboration data is displayed and/or linked to the visual representation of the corresponding video data set. A second embodiment of the present invention relates to a video collaboration interface system, including a correlation module configured to correlate data within a corresponding video data set. A third embodiment of the present invention relates to a video collaboration interface.

Conventional video storage systems fail to facilitate efficiently global collaboration in correspondence with geographic location. Likewise, conventional environmental collaboration systems such as neighborhood watch are tedious manual based systems that rarely include a majority of participants within a particular region. These limitations are overcome by embodiments of the present invention, which facilitate efficient video data correlation, intuitive display, and effective multi-user collaboration on video subject matter.

These and other features and advantages of the present invention will be set forth or will become more fully apparent in the description that follows and in the appended claims. The features and advantages may be realized and obtained by means of the instruments and combinations particularly pointed out in the appended claims. Furthermore, the features and advantages of the invention may be learned by the practice of the invention or will be obvious from the description, as set forth hereinafter.

BRIEF DESCRIPTION OF THE DRAWINGS

The following description of the invention can be understood in light of the Figures, which illustrate specific aspects of the invention and are a part of the specification. Together with the following description, the Figures demonstrate and explain the principles of the invention. The Figures presented in conjunction with this description are views of only particular—rather than complete—portions of the systems and methods of making and using the system according to the invention. In the Figures, the physical dimensions may be exaggerated for clarity.

DETAILED DESCRIPTION OF THE INVENTION

Figure 1:
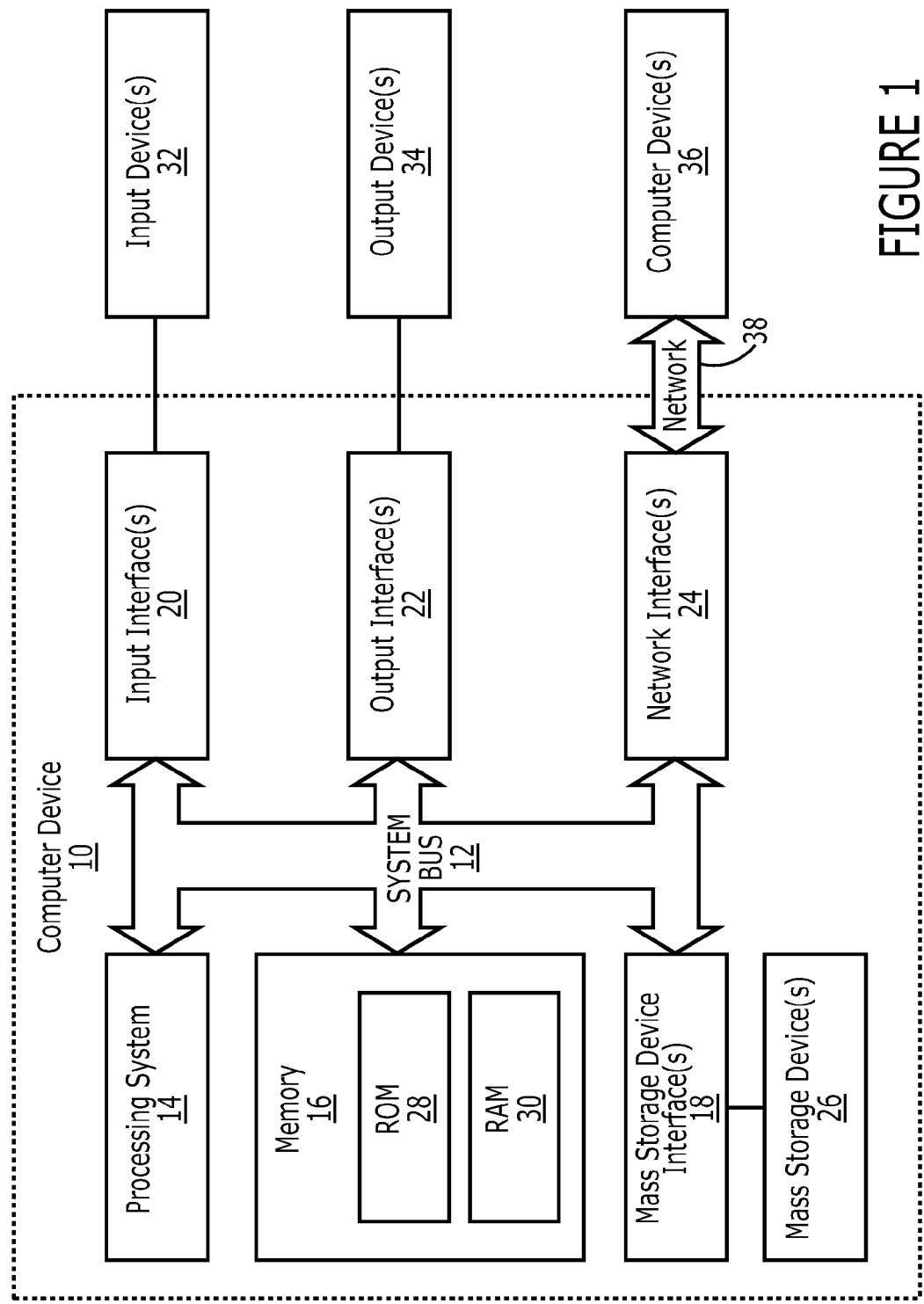
FIG. 1 illustrates a flow chart of a suitable computer operating environment for embodiments of the present invention.

The present invention relates to systems and methods for video data collaboration. One embodiment of the present invention relates to a method for facilitating a geographic video data interface and interactive collaboration system. The method includes displaying representations of stored video data sets on an interactive geographic interface to facilitate collaboration among users. The video data sets are stored on a data storage device that is remotely accessible by a plurality of users across a global data network such as the Internet. The interactive geographic interface includes a visual representation which may be manipulated including pan, zoom level, content, filtering, map type, elevation, etc. Video data sets are received from the video owner including at least video data/sequences and associated characteristic data. The received video data sets are correlated with a geographic location at which the video data was captured. The correlated geographic location is aggregated with the video data set. The video data set is displayed on the interactive geographic interface by a visual representation at the correlated location. Collaboration data about the video data set is received from users or clients other than the video owner. The collaboration data may include observations, comments, geographical links, tags, and/or information about the subject matter of the video data file. The collaboration data is displayed and/or linked to the visual representation of the corresponding video data set. A second embodiment of the present invention relates to a video collaboration interface system, including a correlation module configured to correlate data within a corresponding video data set. A third embodiment of the present invention relates to a video collaboration interface. While embodiments of present invention are described in reference to an interactive video storage and collaboration system, it will be appreciated that the teachings of present invention are applicable to other areas.

The following terms are defined as follows:

Video data set—a set of interrelated data, including but not limited to video data files/sequences, characteristic data, geographic location, and collaboration data. The data within the video data set may be interrelated in a variety of ways. Video data sets include dynamic content in that data may be added or removed. In addition, the video data files/sequences may be live video data streams.

Characteristic data—includes dates, times, and other characteristics related to either the entire video data set, a subgroup/category of a video data set, and/or a particular video data file/sequence.

Geographic location—includes information related to the location at which one or more of the video data files/sequences were captured, including GPS coordinates, elevation, address, zip, country, etc.

Collaboration data—includes any type of information subsequently entered about a video data sequence such as text, commentary, observations, technical details, content based details, geographical links, content links, tags, flags, etc.

Video monitoring system—a system for location based monitoring for purposes including surveillance, monitoring, and personnel performance. A video monitoring system may include any single device or system configured to capture video data including a cell phone and a locally networked computer controlled video monitoring system.

Global data transmission system—a data transmission system for transferring data between distributed components across a geographically large area. For example, the Internet enables data transmission between distributed components across the world. A global data transmission system is defined broadly to include a local data transmission system because a system that is capable of transferring data across large distances is also capable of transferring data across short distances.

Control module—a computer and/or electrical component for receiving, transmitting, displaying multi-location video data, compiling video from multiple sources, and/or reencoding into a single video stream.

Client module—a computer and/or electrical component that is configured to enable a user to view and interact with the interactive geographic interface, including displaying representations of video data sets and displaying video sequences.

The following disclosure of the present invention is grouped into two subheadings, namely "Operating Environment" and "Geographic Video Storage and Interactive Collaboration System". The utilization of the subheadings is for convenience of the reader only and is not to be construed as limiting in any sense.

Operating Environment

FIG. 1 and the corresponding discussion are intended to provide a general description of a suitable operating environment in which the invention may be implemented. One skilled in the art will appreciate that the invention may be practiced by one or more computing devices and in a variety of system configurations, including a networked configuration. Alternatively, the invention may also be practiced manually in whole or in part following the same procedures.

Embodiments of the present invention embrace one or more computer readable media, wherein each medium may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system.

With reference to FIG. 1, a representative system for implementing the invention includes computer device 10, which may be a general-purpose or special-purpose computer. For example, computer device 10 may be a personal computer, a notebook computer, a personal digital assistant ("PDA"), smart phone, or other hand-held device, a workstation, a minicomputer, a mainframe, a supercomputer, a multi-processor system, a network computer, a processor-based consumer electronic device, or the like.

Computer device 10 includes system bus 12, which may be configured to connect various components thereof and enables data to be exchanged between two or more components. System bus 12 may include one of a variety of bus structures including a memory bus or memory controller, a peripheral bus, or a local bus that uses any of a variety of bus architectures. Typical components connected by system bus 12 include processing system 14 and memory 16. Other components may include one or more mass storage device interfaces 18, input interfaces 20, output interfaces 22, and/or network interfaces 24, each of which will be discussed below.

Processing system 14 includes one or more processors, such as a central processor and optionally one or more other processors designed to perform a particular function or task. It is typically processing system 14 that executes the instructions provided on computer readable media, such as on memory 16, a magnetic hard disk, a removable magnetic disk, a magnetic cassette, an optical disk, or from a communication connection, which may also be viewed as a computer readable medium.

Memory 16 includes one or more computer readable media that may be configured to include or includes thereon data or instructions for manipulating data, and may be accessed by processing system 14 through system bus 12. Memory 16 may include, for example, ROM 28, used to permanently store information, and/or RAM 30, used to temporarily store information. ROM 28 may include a basic input/output system ("BIOS") having one or more routines that are used to establish communication, such as during start-up of computer device 10. RAM 30 may include one or more program modules, such as one or more operating systems, application programs, and/or program data.

One or more mass storage device interfaces 18 may be used to connect one or more mass storage devices 26 to system bus 12. The mass storage devices 26 may be incorporated into or may be peripheral to computer device 10 and allow computer device 10 to retain large amounts of data. Optionally, one or more of the mass storage devices 26 may be removable from computer device 10. Examples of mass storage devices include hard disk drives, magnetic disk drives, tape drives and optical disk drives. A mass storage device 26 may read from and/or write to a magnetic hard disk, a removable magnetic disk, a magnetic cassette, an optical disk, or another computer readable medium. Mass storage devices 26 and their corresponding computer readable media provide nonvolatile storage of data and/or executable instructions that may include one or more program modules such as an operating system, one or more application programs, other program modules, or program data. Such executable instructions are examples of program code means for implementing steps for methods disclosed herein.

One or more input interfaces 20 may be employed to enable a user to enter data and/or instructions to computer device 10 through one or more corresponding input devices 32. Examples of such input devices include a keyboard and alternate input devices, such as a mouse, trackball, light pen, stylus, or other pointing device, a microphone, a joystick, a game pad, a satellite dish, a scanner, a camcorder, a digital camera, and the like. Similarly, examples of input interfaces 20 that may be used to connect the input devices 32 to the system bus 12 include a serial port, a parallel port, a game port, a universal serial bus ("USB"), a firewire (IEEE 1394), or another interface.

One or more output interfaces 22 may be employed to connect one or more corresponding output devices 34 to system bus 12. Examples of output devices include a monitor or display screen, a speaker, a printer, and the like. A particular output device 34 may be integrated with or peripheral to computer device 10. Examples of output interfaces include a video adapter, an audio adapter, a parallel port, and the like.

One or more network interfaces 24 enable computer device 10 to exchange information with one or more other local or remote computer devices, illustrated as computer devices 36, via a network 38 that may include hardwired and/or wireless links. Examples of network interfaces include a network adapter for connection to a local area network ("LAN") or a modem, wireless link, or other adapter for connection to a wide area network ("WAN"), such as the Internet. The network interface 24 may be incorporated with or peripheral to computer device 10. In a networked system, accessible program modules or portions thereof may be stored in a remote memory storage device. Furthermore, in a networked system computer device 10 may participate in a distributed computing environment, where functions or tasks are performed by a plurality of networked computer devices.

Geographic Video Storage and Collaboration System

Figure 2:
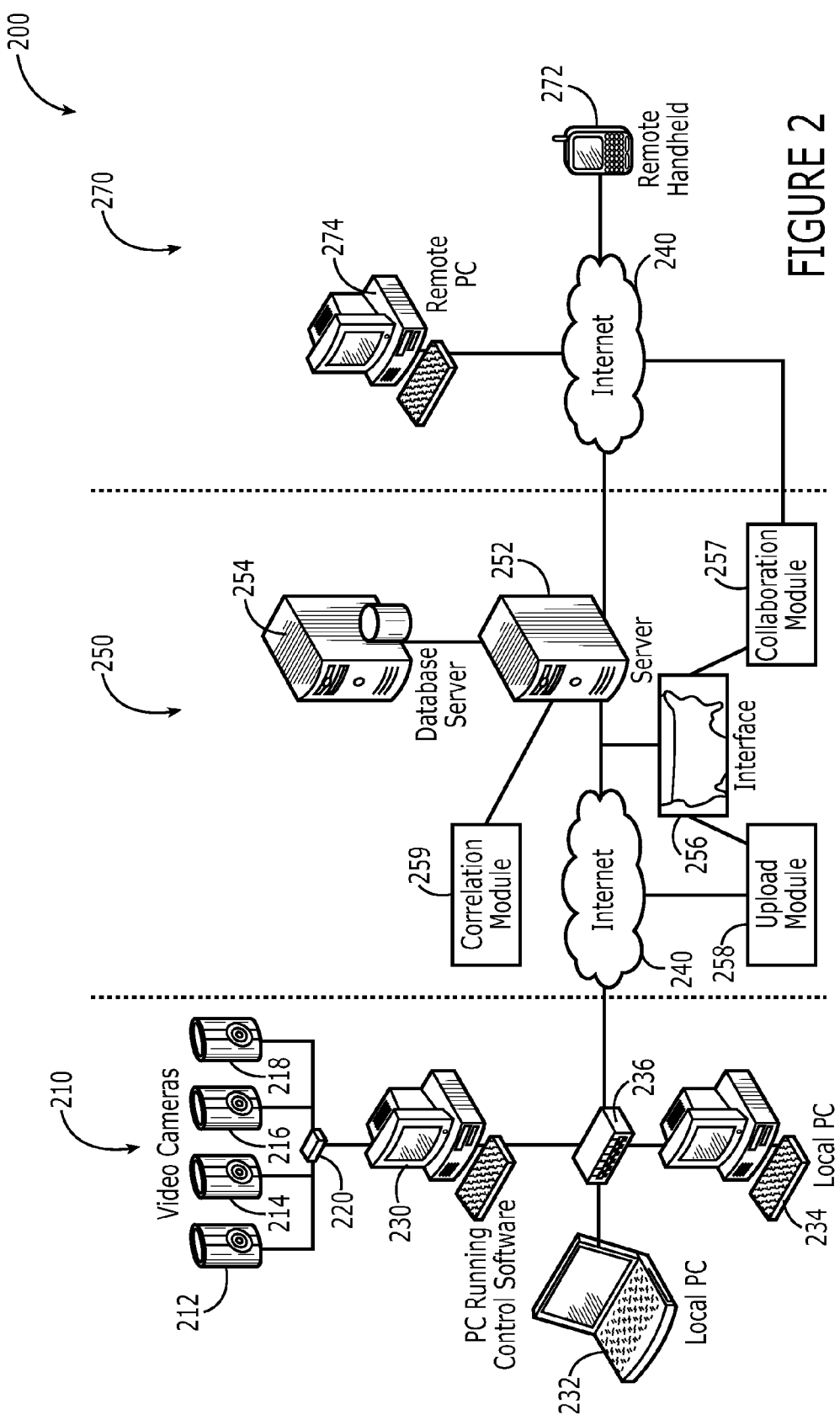
FIG. 2 illustrates a network schematic of a suitable distributed computer architecture for embodiments of the present invention.

Reference is next made to FIG. 2, which illustrates a network schematic view of a distributed computer architecture suitable for effectuating embodiments of the present invention, designated generally at 200. The illustrated system 200 architecture is an example of one type of video monitoring system in which embodiments of the present invention may be utilized. Various components of the illustrated system will be further described for purposes of reference to the embodiments of the present invention. It will be appreciated that embodiments of the present invention may be utilized with other alternative distributed video monitoring system architectures such as peer to peer based systems. The illustrated system 200 includes a local computer controlled video monitoring/surveillance system 210, a distributed data processing system 250, and a remote client system 270. The systems 210, 250, 270 are coupled via the Internet 240 acting as a global data transmission system. They may also be coupled via a local network, WAN, LAN, or other network arrangement. As is well known in the industry, various components may be further distributed or geographically consolidated for purposes of utilizing hardware and/or data coupling resources.

The computer controlled video monitoring system 210 includes a plurality of video capture devices 212, 214, 216, 218, a video router 220, a control module 230, a local laptop client 232, a local PC client 234, and a local network router 236. For purposes of the present application, the computer controlled video monitoring system 210 may also be referred generally as a video capture system for a particular video owner. Therefore, all videos captured by a particular video monitoring system 210 are generally associated with a particular video owner. The video capture devices 212, 214, 216, 218 are digital video cameras configured to capture video data of a particular location and generate a video data signal that includes graphical sequential images of the particular location. A set of unique characteristic data may also be associated with a particular captured video sequence from each video capture device 212, 214, 216, 218 including but not limited to time and date of video capture, orientation, camera type, etc. Likewise, the video capture device associated with a particular video sequence may have unique model characteristics such as indoor, outdoor, discrete, mobile, mobile with GPS, 120 degree north pan and tilt, 5× south zoom, etc. One type of suitable digital video capture device is a WILIFE™ brand camera. The video capture devices 212, 214, 216, 218 are data coupled to the control module 230 via the video router 220. The video router 220 is an optional component and may be any type of data converter, multiplexer, or router such as a USB power line data converter or Ethernet data converter. For example, the video capture devices 212, 214, 216, 218 may be coupled to a power line network such as a HOMEPLUG® type system in which a USB or Ethernet powerline bridge allows the control module 230 to receive the video data signal from all of the video capture devices 212, 214, 216, 218 across the power line. The video capture devices 212, 214, 216, 218 may comprise a variety of different types of devices including but not limited to analog, digital, wireless, wired, panable, fixed, indoor, outdoor, discrete, spy, mobile, etc. The control module 230 is a multi-use personal computer running a software module configured to receive and process the video data signals from the video capture devices 212, 214, 216, 218. The control module 230 is an optional component for use with certain types of camera systems. For example, the software module may be a WILIFE™ brand video control program. The control module 230 may perform other tasks in addition to managing the video data signals with a well known multiprocessing operating system such as Microsoft WINDOWS®. The control module 230 may be configured to record, display, alert, or transmit data corresponding to the video data signals from the video capture devices 212, 214, 216, 218. The local laptop client 232 and local PC client 234 are data coupled to control module 230 via an optional network router 236 such as an Ethernet wired router or wireless 802.11 type data router. Various other local network architectures may be utilized to distribute the video data signals among the local clients 232, 234 and between the video capture devices 212, 214, 216, 218, and the control module 230.

The computer controlled video monitoring system 210 is coupled to the distributed data processing system 250 via the Internet 240. The distributed data processing system 250 includes a database server 254, a server 252, a correlation module 259, and an interface 256. The database server 254 or data storage device may be configured to store video data sets from one or more video monitoring systems 210, authentication information about each video monitoring system, user account information, etc. The correlation module 259 may facilitate correlating and/or aggregating associated video data received from a particular computer controlled video monitoring system or video owner together into a video data set including but not limited to video data, video characteristic data, geographic location, collaboration data, etc. The correlation module 259 may also correlate and/or aggregate associated video data corresponding to a particular video data set but not necessarily received from the video owner or associated video monitoring system including but not limited to geographic location, video characteristic data, collaboration data, etc. The correlation module includes an algorithm configured to correlate a video data set with a geographic location corresponding to the location at which video data was captured. The algorithm may include mathematical and database correlations with Global Positioning Systems (GPS) data, cellular triangulation data, address grids, user provided content, etc. The server 252 and the interface 256 provide a plurality of data transmission and user interface functions related to the data stored on the database server 254. The server 252 is data coupled to the Internet 240 and the interface 256 to facilitate data transmissions between both video owners/systems such as the computer-controlled video monitoring system 210 and remote clients/users 270. Various data transmission functions may be performed by the server 252 and/or associated modules and algorithms such as authentication, encryption, data conversion, routing, etc. The interface 256 includes an interactive geographic interface (IGI) of a particular geographic region. The IGI is a graphical user interface disposed at a particular Internet URL address through which representations of video data sets and other data is displayed in association with geographic locations. The interface 256 includes a plurality of video data representations individually corresponding to the video data sets stored on the database server 254. The interface 256 and video data representations will be described in more detail with reference to FIGS. 3-6. The interface 256 may include various modules to facilitate video data related transmissions between video monitoring systems 210 and client systems 270. The interface 256 includes a collaboration module 257 that facilitates receiving collaboration data from client devices 270 about video data sets stored on the database server 254. The collaboration module 257 may allow users such as the illustrated remote PC 274 and handheld 272 to upload or create collaboration data about the content of a particular video data set. Collaboration data may include comments, graphical links between data sets, graphical links between video data sets and other geographic locations, etc. The interface 256 also includes an upload module 258 that facilitates video data set uploads to the database server 254 from corresponding video owners or particular video monitoring systems 210. The upload module 258 may include algorithms for detecting and converting all uploaded videos to a single data format universally compatible with the interface 256 including but not limited to FLASH® video data format. Various permissions and parameters may be designed for uploaded content. For example, the uploaded content may be designated to be publicly available, selectively available, or private on the interface 256. The upload module 258 may also include an authentication algorithm that ensures that the uploaded video data set is associated with the capture origination of the upload (i.e. the same video monitoring system/owner recorded the video data within the video data set that is currently uploading the video data set).

Various other interface 256 based modules and algorithms may be included to provide user interface functionalities such as filtering, searching, video owner collaboration censorship, storage limitations, etc. A filtering module may be configured to enable a user to filter the content displayed on the interface 256 according to a set of designated criteria. A searching module may be configured to enable a user to perform content based searches for video data sets that match a specific criterion. For example, a user may perform a search for all video recorded within a particular zip code on a particular data and time range. It will be appreciated that geographic based searches may be performed using well known geographic manipulation tools including zooming, panning, tilting, etc. Likewise, a video owner collaboration censorship module may enable a video owner of a particular video data set to delete or block collaboration data from being uploaded by a user/client. Storage limitations may be utilized to dynamically identify if a particular video data set is exceeding a predetermined capacity on the database server 254 and to notify the corresponding video owner and/or to restrict further uploads associated with the particular video data set.

The remote client system 270 includes a remote client PC 274 and a remote client handheld 272, both data coupled to the Internet 240. The remote clients 272, 274 are examples of users/clients configured to display the interface 256 of the distributed data system 250 to facilitate interaction with video data sets in accordance with embodiments of the present invention. Various other types of remote client devices may also act as users/clients, including but not limited computers, phones, cameras, and other electronic devices coupled to the Internet 240 via any type of data connection. The remote clients 272, 274 may also interface with the server 252 or additional modules for purposes of authentication, data routing, electronic payment, management, etc. The remote clients 272, 274 may be coupled to the Internet 240 utilizing various well known connection schemes including but not limited to cellular phone data networks, local computing data networks, etc. The remote clients 272, 274 may interact with and/or receive the interface 256 through an Internet web browser or directly through a particular local software module configured to access the interface 256. Likewise, the remote clients 272, 274 may also receive emails, SMS, and/or other forms of direct data transmission from the interface 256. The remote clients 272, 274 may interact with the interface 256, including viewing video data sequences, viewing characteristic data about a video data set or specific video sequence, searching and displaying video related content, filtering the display so as only to display particular content, etc. In addition, the remote clients 272, 274 may upload or generate collaboration data via the collaboration module 257 to be associated with a particular video data set and/or a particular video data sequence. It will be appreciated that a device/system may act as both a video owner/monitoring system and a client. For example, the remote handheld 272 may upload a video data set of captured video to be stored on the database server 254 via the upload module 258 while also viewing video data sets from other video monitoring systems.

Various alternative architectures may also be employed in accordance with embodiments of the present invention. It will be appreciated that any environmental video generation system coupled directly or indirectly to a global data transmission system 240 may be utilized as a video owner in conjunction with embodiments of the present invention. For example, a cell phone or digital camera may upload selected video clips taken by the device itself, across the Internet 240 in accordance with embodiments of the present invention. In addition, it will be appreciated that the data storage of video data sets may alternatively be decentralized in whole or in part, including but not limited to peer to peer data storage and interfacing.

Additional data may also be displayed and/or available on the interface 256, including sex-offender data, amber alerts, criminal statistics, traffic cameras, weather, etc. The additional data may be graphically linked to a particular video data set and/or displayed within a video data set representation so as to illustrate the geographic location and/or correlation with one or more video data sequences or sets.

With continued reference to FIG. 2, the interface 256 may include additional optional modules to enable viewers and collaborators to perform searches and/or subscribe to automatic downloads/alerts regarding specific content criteria stored on the database server 254 and/or displayed on the interface 256. For example, a user may specify selected criteria and receive automatic data downloads and/or alerts when matching data becomes available and/or is displayed on the interface 256. The criteria may include text matching, image recognition/matching, data compilation, geographic location proximity, category, video data content, etc. Any well known criteria correlation algorithm may be used to dynamically identify matching content. For example, a user may select to receive an alert whenever video within a particular geographic region or proximal distance is stored on the system. The proximal distance criteria may be paired with an automatic location identification system (i.e. GPS) so as to update a user's location and thereby adjust the criteria for automatic download. Likewise, a facial recognition algorithm may be utilized to identify videos including a specific person. Alternatively, a user may wish to automatically receive video sequences in which the description or collaboration data includes an identification of a particular animal. In addition, these alerts may include aggregations or other data compilations regarding the video data, characteristic data, and/or the collaboration data. For example, a user may elect to receive alerts based on criteria that includes the total reported video captured crimes in a particular region, which is based upon an aggregation of multiple data correlations and compilations. These alerts or automatic downloads may be facilitated via any electronic data transmission including but not limited to SMS (text message), email, phone, video conference, etc. A user criteria input interface and correlation algorithm module may be incorporated within the system. A specific criteria may also be selected to provide collaborative user interface groups including but not limited to neighborhoods watch, homeowner associations, victim groups, specific interest groups, etc. For example, users within a specific group may receive automatic downloads of video data or collaboration data relating to the specific group criteria. In addition, the interface may include displays limited to data related to the specific criteria of the group so as to further facilitate interactions among group members.

Figure 3:
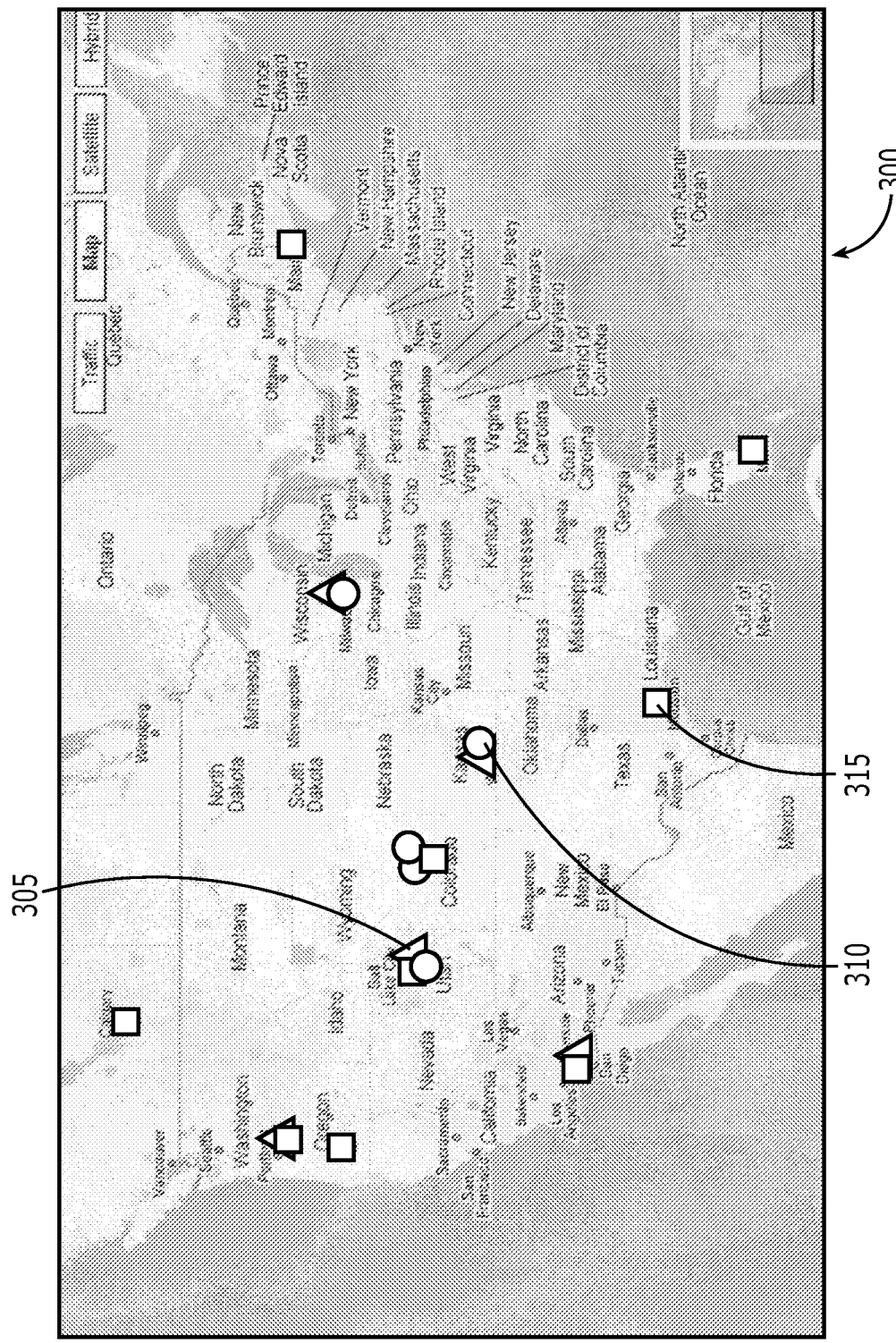
FIG. 3 illustrates a macro zoom representation of an interactive geographic interface in accordance with one embodiment of the present invention.

Reference is next made to FIG. 3, which illustrates a macro zoom representation of an interactive geographic interface in accordance with embodiments of the present invention, designated generally at 300. The illustrated interface 300 may be associated with the architecture and element 256 illustrated and described in reference to FIG. 2. The interface may be displayed at a particular location on a global data transmission system such as a URL address on the Internet. The interface may include various software modules that may be utilized by users to interact with the displayed data. For example, the FLASH® video players, Java authentication, HTML hyper linking, etc. may be utilized to provide interactive functionality. The interface 300 enables intuitive graphical representations and data linking to video, characteristic, and collaboration data stored on a data storage device. The interface 300 includes various video data representations 305, 310, 315 corresponding to video data sets stored or associated with the video collaboration interface system. The video data representations 305, 310, 315 are graphically positioned at locations on the interface 300 corresponding to the geographic location at which the corresponding video data for each video data representation 305, 310, 315 was captured. In addition, the video data representations 305, 310, 315 may be uniquely colored or shaped to correspond to a specific characteristic data content about the corresponding video data such as a category of video content data. For example, the Utah location video data representation 305 include circle, square, and triangle shaped dots, which may indicate that three different categories of video data are located at this location. Categories or content-based designations may correspond to crime, nature, personal, etc. Users may selectively filter the interface so as to only display specific categories or other designated criteria. Users may also search the interface utilizing standard text-based Boolean searches for characteristic, video, and/or collaboration data corresponding to selected criteria. Various well known sub-interfaces or dialog boxes may be used to facilitate the filtering and searching functionalities by dynamically interfacing with the video data set content.

With continued reference to FIG. 3, the illustrated interface 300 is a scalable geographic display of a particular geographic region (i.e. The United States and portions of Canada and Mexico). The illustrated scale level may be referred to as macro-zoom in that it displays a large geographic region. Since the illustrated interface 300 is displayed at a macro level, the video data representations 305, 310, 315 may represent multiple video data sets at independent locations not discernable on the macro zoom level. The interface 300 may be scalable in that geographic regions may be zoomed in or out and the relative geographic display content may be adjusted accordingly. It will be noted that in the bottom right corner of the interface 300 is a secondary geographic representation illustrating a greater macro zoom representation of the current geographic region. Although not illustrated, the interface may also include additional three dimensional geographic related information, such as the elevational positioning, camera orientation direction, field of view, and inclination/declination of the video data representations 305, 310, 315 in addition to the illustrated two dimensional surface positioning. Various other well known geographic interface functionalities may be incorporated including but not limited to alternative three dimensional views, satellite images, radar based images, alternative map architectures, etc. Likewise, various user interface controls may be provided to enable users to pan, zoom, split screen, picture in picture, tilt, perspective, etc.

Figure 4:
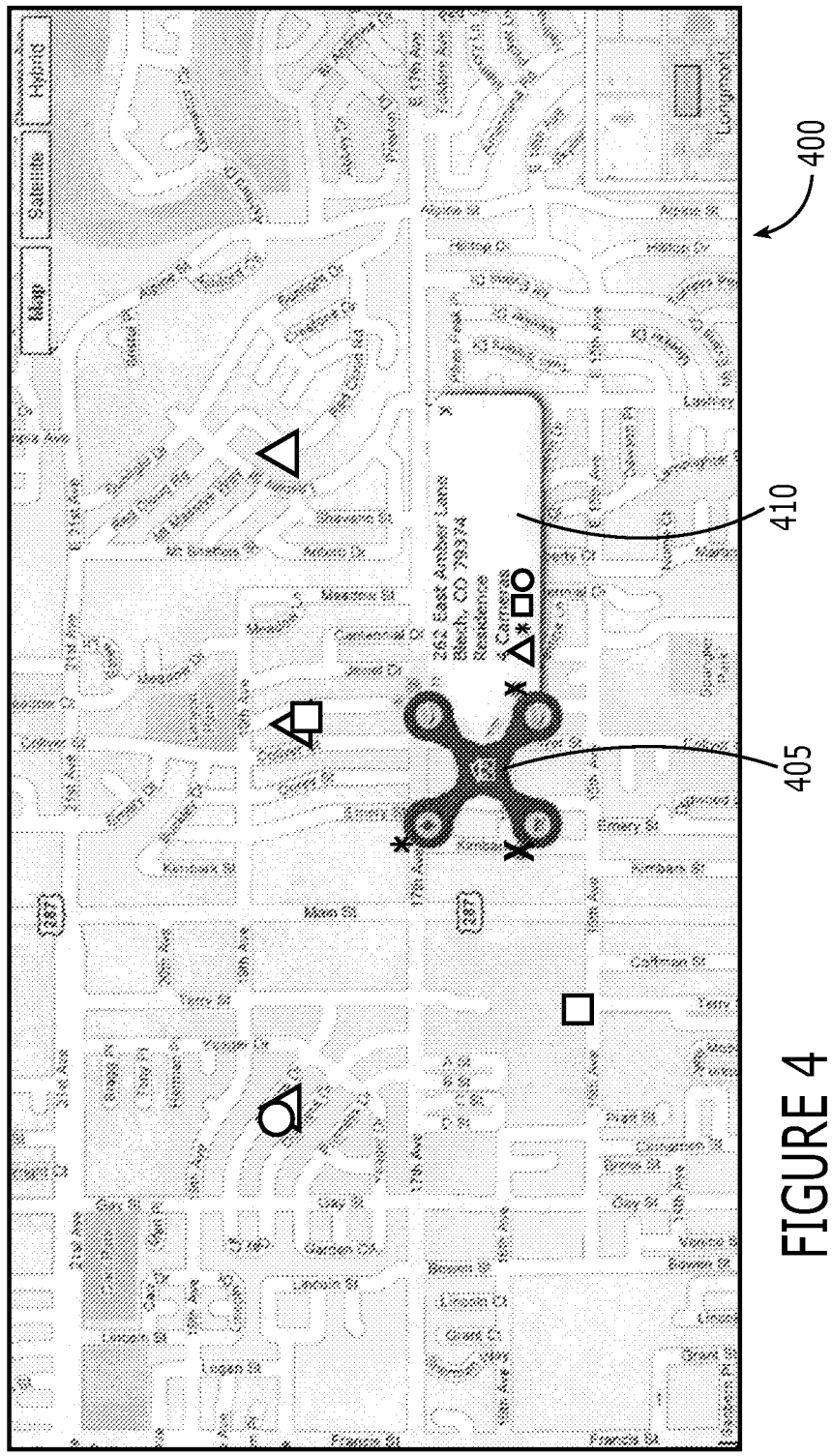
FIG. 4 illustrates a micro zoom representation of the interactive geographic interface illustrated in FIG. 3, including a user-activated display of characteristic data within a video data set corresponding to the illustrated geographic location.

Reference is next made to FIG. 4, which illustrates a relative micro zoom representation of the interactive geographic interface of FIG. 3, including user-activated display of characteristic data within a video data set corresponding to illustrated geographic location, designated generally at 400. The illustrated interface 400 is zoomed in to illustrate a geographic region approximately the size of a particular neighborhood. Various video data representations are positioned at specific nearby graphical locations corresponding to the location at which associated video sequences are captured. In response to a user selection, the "Amber Lane" video data representation is expanded into a clover 405 and characteristic data box 410, displaying additional characteristics about the video data set corresponding with this geographic location. The characteristic box 410 includes general characteristic data including the specific street address of the location, the type/purpose of the location, the number of cameras, and a set of colored dots representing the categories of video content data within the particular video data set. The clover 405 is centered at the location and includes graphical representations of the type of location (residence/business), the included camera model types, and uniquely shaped dots with numbers indicating the number of video sequences captured by the corresponding camera models and their corresponding categories. The type of location is displayed at the center of the clover 405. The camera model types and number of specific captured video sequences are graphically displayed at each of the clover's 405 four petal-shaped extensions. The system may be configured to expand the dots to display the clover 405 and characteristic box 410 when a user's mouse is positioned over the corresponding dot or location. Various other interactive display interface schemes and characteristic data display layouts may also be utilized in accordance with the present invention.

Figure 5:
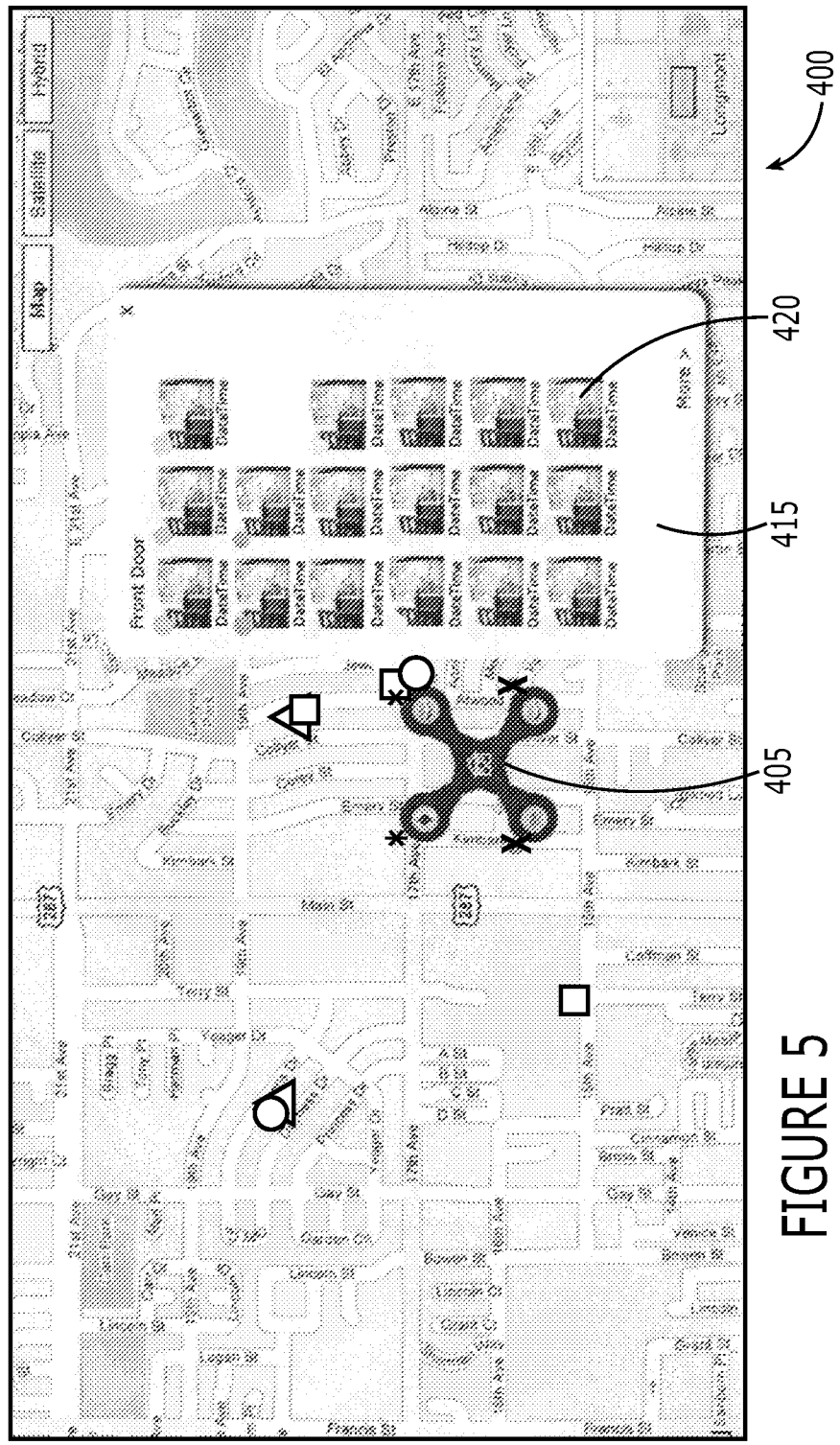
FIG. 5 illustrates the micro zoom representation of the interactive geographic interface illustrated in FIG. 4 further configured to illustrate a plurality of video data files corresponding to the illustrated geographic location.

Reference is next made to FIG. 5, which illustrates the micro zoom representation of the interactive geographic interface of FIG. 4 further configured to illustrate a plurality of video data sequences corresponding to the illustrated geographic location, designated generally at 400. The clover 405 representing a video data set captured or associated with "262 Amber Lane", is selected and further configured to display a video box 415 of specific video sequences 420 captured by a particular video camera at this location. The illustrated video box 415 includes three sequences captured of the * category, two sequences of the square category, and twenty two sequences of the circle category (not all of which are displayed in the illustrated video box 420). Each video sequence includes a static image representation or thumbnail, a category shaped dot, and the date and time of the captured video sequence. As illustrated, the video box 415 may be configured to limit the number of sequence displayed and allow a user to link to additional box displays to view remaining video sequences. Each video sequence 420 may also be configured to enable automatic playback when a user selects the video. For example, a mouse click may cause an automatic playback of the corresponding video data file. The playback may include remote playback as part of the system utilizing embedded video and/or the ability to download the video sequence and play associated video data file locally.

Figure 6:
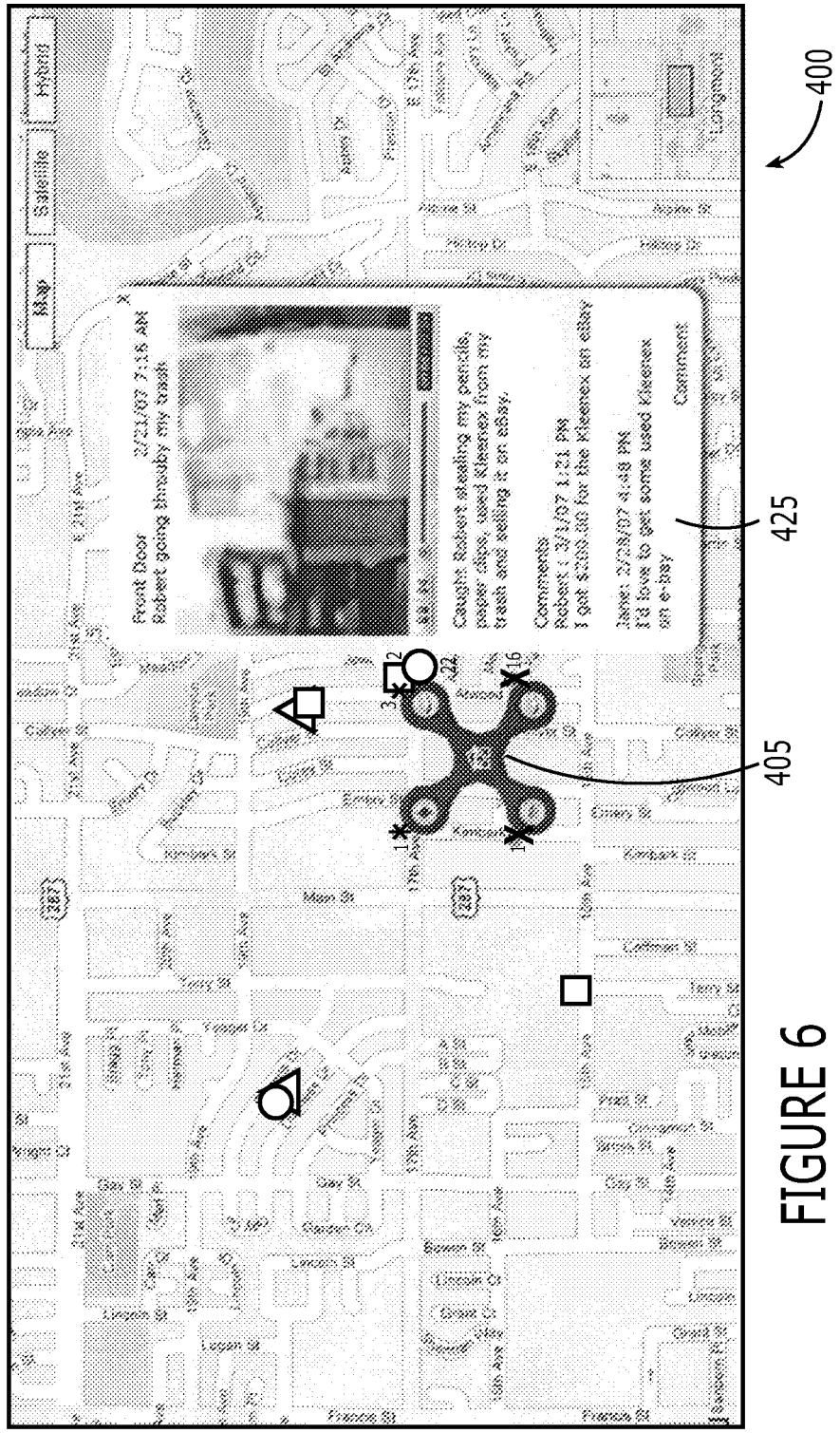
FIG. 6 illustrates the micro zoom representation of the interactive geographic interface illustrated in FIG. 4 further configured to illustrate detailed characteristic data and collaboration data about a particular video data file/sequence within a particular video data set corresponding to the illustrated geographic location.

Reference is next made to FIG. 6, which illustrates the micro zoom representation of the interactive geographic interface of FIG. 4 further configured to illustrate detailed characteristic data and collaboration data about a particular video data file/sequence corresponding to the clover 405 geographic location. The collaboration data is displayed in a collaboration box 425. The collaboration box 415 may include characteristic data about the video sequence including a description, image, date and time of video capture, indication of the camera model that captured the video, etc. Users other than the owner of the captured video sequence are given the opportunity to generate and/or upload data corresponding to the video sequence. The illustrated collaboration data includes a comment by Robert on Mar. 1, 2007 and a comment by Jane on Feb. 28, 2007. The collaboration data may also include graphical and hyper links to other videos which a user deems to have similar or associated characteristics. In operation, the illustrated collaboration may be useful in correlating Robert with other local crimes and/or learning about the price of KLEENEX on EBAY.

Although not illustrated, the interface may include graphical linking collaboration data between video sequences. For example, an arc or line may be created and displayed video data sets, video data sequences, and/or non-video data representing some form of subject matter link between particular video sequences at multiple locations. The arc or line may be dynamically created in response to a user dragging a video from one location to another.

Although not illustrated, the interface may include an upload interface for video owners or video monitoring systems to upload video data sets, including video data sequences and characteristic data. The upload interface may include detecting the upload medium, converting video data formats, prompting for characteristic data, etc. The upload interface may also designate the uploading user as the owner and enable various management/control functionalities. For example, the interface may include a specific owner interface displaying all uploaded video sequences and corresponding characteristic and collaboration data. The owner interface may enable the owner to edit and/or delete the displayed video and/or characteristic data. The owner interface may also facilitate various collaboration data monitoring or corresponding video data including editing, approval before display, rejection, private access, linking, etc.

Various other embodiments have been contemplated, including combinations in whole or in part of the embodiments described above.

What is claimed is:

1. A method for facilitating a geographic based video data interface and interactive collaboration system comprising:
   providing a data storage device configured to store video data sets;
   providing an interactive geographical interface including a geographic display representing a particular geographic region, wherein the interactive geographical interface is accessible over a global data transmission system;
   receiving a first video data set including a video file and video characteristic data from a video owner, wherein the video file includes a sequence of captured images, and wherein the video characteristic data includes at least one of camera type, video capture time, camera orientation, crime type, video subject matter, human video content, object video content, video format, camera manufacturer, and video owner description;
   correlating the received first video data set with a geographic location corresponding with the location at which the video file of the first video data set was captured;
   adding the geographic location to the first video data set;
   storing the first video data set and the geographic location on the data storage device;
   providing a display of a representation of the first video data set on the interactive geographical interface visually corresponding to the geographic location including a display of the video characteristic data;
   receiving a set of collaboration data about the first video data set from a user other than the video owner; and
   providing a display of the set of collaboration data within the representation of the first video data set,
   wherein receiving the first video data set from the video owner includes authenticating the video owner as a creator of the video file of the first video data set, and
   wherein the authenticating the video owner as the creator of the video file of the first video data set includes ensuring that the first video data set is associated with a capture origination of the video file.

2. The method of claim 1, wherein the interactive geographic interface is provided at a URL address on the Internet.

3. The method of claim 1, wherein the method further includes correlating and aggregating the first video data set with a second video data set received from the video owner, wherein the second video data set includes the same geographic location as the first video data set.

4. The method of claim 1, wherein providing the display of the representation of the first video data set includes providing a dynamic embedded single step system for individual video execution of the video file included in the first video data set.

5. The method of claim 1, wherein the method includes providing a collaboration interface to enable a user to upload collaboration data about the first video data set.

6. The method of claim 1, wherein the method includes providing a management interface to enable a user to delete received video data sets originating from the same video owner.

7. The method of claim 1, wherein receiving the first video data set from the video owner includes identifying the format of the video file and converting the video file to another format.

8. An interactive video collaboration interface system comprising:
   a data storage device configured to store a plurality of video data sets, wherein each video data set includes at least video data, geographic location, and characteristic data;
   a data correlation module configured to correlate and aggregate the plurality of video data sets based at least in part on correlations between at least one of video data, geographic location, characteristic data, and collaboration data, wherein the correlation module includes an algorithm to correlate video data sets with geographic location;
   an interactive geographical interface including a geographic display of a particular geographic region, wherein the interactive geographic interface includes a plurality of video data representations corresponding to the plurality of video data sets stored on the data storage device, and wherein each of the plurality of video data representations is disposed at a position on the geographic display corresponding to the geographic location of the video data set corresponding to that video data representation, and wherein each video data representation includes a visual representation of the characteristic data and collaboration data of the video data set corresponding to that video data representation, and wherein each video data representation includes an embedded single step system for video execution of the video data included in the video data set corresponding to that video data representation;
   a collaboration module including an interface through which the collaboration data is generated and stored on the data storage device, wherein the collaboration module further includes an algorithm configured to correlate and aggregate the collaboration data with at least one of the video data sets to allow displaying the collaboration data with the video data representation corresponding to the at least one video data sets; and
   a global data transmission system including a data coupling between the interactive geographical interface, at least one video capture system, and at least one viewer, wherein the at least one video capture system is configured to record and transmit video data sets to the data storage device via an upload module, and wherein the at least one viewer is configured to display the geographic display and upload collaboration data via the collaboration module,
   wherein the upload module includes an authentication module configured to correlate the origination of the upload of the received video data sets with the generation of the received video data sets, and
   wherein the correlating the origination of the upload of the received video data sets with the generation of the received video data sets includes ensuring that each received video data set is associated with a capture origination of the video data included in the received video data set.

9. The system of claim 8, wherein the geographic display is a scalable map and wherein the visual location of the plurality of video data representations are dynamically scaled in correspondence with the interactive geographic interface.

10. The system of claim 8, wherein the visual representation of the characteristic data includes at least one of a color based image and a shape based image corresponding to the video data included with the video data set including that characteristic data.

11. The system of claim 8, wherein the visual representation of the characteristic data includes at least one of camera name, date and time of video recordation, video title, and description of video.

12. The system of claim 8, wherein the collaboration data includes text based linking and graphical based linking between video data sets.

13. An interactive video collaboration interface system comprising:
   an interactive geographical interface including a geographic display of a particular geographic region, wherein the geographic display includes a plurality of video data representations individually corresponding to a plurality of video data sets including video data, characteristics data, and collaboration data, and wherein each video data representation is disposed at a position on the geographic display corresponding to a geographic location at which video data of the video data set corresponding to that video data representation was captured, and wherein each video data representation includes a visual representation of the characteristic data and collaboration data of the video data set corresponding to that video data representation, and wherein each video data representation includes an embedded system for video execution of the video data of the video data set corresponding to that video data representation;
   a collaboration module configured to enable collaboration data to be remotely uploaded and dynamically displayed in association with at least one of the video data representations, wherein the collaboration module includes a visual interface to enable a user to visually select the at least one video data representation corresponding to the collaboration data; and
   a video upload module configured to enable an additional video data set to be remotely uploaded and dynamically displayed in association with at least one of an existing video data representation and a new video data representation, wherein the video upload module includes an authentication module configured to authenticate whether the additional video data set is being uploaded by at least one of a user and a video system that recorded the additional video data set,
   wherein the authenticating whether the additional video data set is being uploaded by the at least one of the user and the video system that recorded the additional video data set includes ensuring that the additional video data set is associated with the capture origination of the video data included in the additional video data set.

14. The system of claim 13, wherein the authentication module includes an algorithm configured to correlate the origination of the additional video data set with the geographic location of the additional video data set.

15. The system of claim 13, wherein the visual representation of the characteristic data includes at least one of a color based image and a shape based image corresponding to the video data included with the video data set including that characteristic data.

16. The system of claim 13, wherein the visual representation of the characteristic data includes at least one of camera name, date and time of video recordation, video title, and description of video.

17. The system of claim 13, wherein collaboration data includes text based linking and graphical based linking between video data sets.

* * * * *